July 12, 1960 R. D. FISHER ET AL 2,945,217

MAGNETIC DATA STORAGE DEVICES

Filed Nov. 7, 1958 5 Sheets-Sheet 1

INVENTORS
ROBERT D. FISHER
JEROME S. SALLO &
IGNATIUS TSU

BY [signature]
[signature: Louis A. Kline]
THEIR ATTORNEYS

INVENTORS
ROBERT D. FISHER
JEROME S. SALLO &
IGNATIUS TSU
BY Louis A. Kline
Hauender
THEIR ATTORNEYS July 12, 1960 R. D. FISHER ET AL 2,945,217

MAGNETIC DATA STORAGE DEVICES

Filed Nov. 7, 1958 5 Sheets-Sheet 3

INVENTORS
ROBERT D. FISHER
JEROME S. SALLO &
IGNATIUS TSU

BY Louis A. Kline
J. Lavender

THEIR ATTORNEYS

INVENTORS
ROBERT D. FISHER
JEROME S. SALLO &
IGNATIUS TSU
BY Louis A. Kline
[signature]
THEIR ATTORNEYS

INVENTORS
ROBERT D. FISHER
JEROME S. SALLO &
IGNATIUS TSU

BY Louis A. Kline
J. Cavender
THEIR ATTORNEYS

United States Patent Office 2,945,217
Patented July 12, 1960

2,945,217

MAGNETIC DATA STORAGE DEVICES

Robert D. Fisher, Jerome S. Sallo, and Ignatius Tsu, Dayton, Ohio, assignors to The National Cash Register Company, Dayton, Ohio, a corporation of Maryland Filed Nov. 7, 1958, Ser. No. 827,412

13 Claims. (Cl. 340—174)

The present invention relates generally to data storage devices and more specifically relates to new and improved magnetic data storage devices which are adaptable for use as memory elements in present day electronic computers and data processors.

Magnetic data storage devices presently employed in a coincident current memory, are normally in the form of magnetic cores of toroidal configuration and have a relatively high magnetic remanence and a substantially rectangular hysteresis characteristic. However, even though toroidal cores are admirably well suited as storage devices, they are nevertheless extremely fragile, quite difficult to fabricate, and require an expenditure of a considerable amount of time and effort in order to be operatively connected in circuit.

In an attempt to alleviate some of these problems, there has been developed a magnetic data storage device commonly known as a "twistor," such as shown and described in the November 1957 issue of "The Bell System Technical Journal" by A. H. Bobeck, volume XXXVI, pages 1319 to 1340. Such a device normally comprises a length of non-magnetic electrically conductive wire, which constitutes a common core, and a coaxial layer of saturable ferromagnetic material extruded on the outermost surface of the core. The core and the ferromagnetic coating are both simultaneously stretched and twisted and the ends thereof maintained in a fixed position during operation of the device. As a direct result of the applied stretching and twisting actions, the easy direction of magnetization of the magnetic coating is oriented from a direction substantially parallel to the longitudinal axis of the core to a coaxial one of substantially helical configuration throughout the entire core length, similar to the threads of a screw. Such a ferromagnetic coating has been found to possess a substantially high positive and negative magnetic remanence and a substantially rectangular hysteresis characteristic. Consequently, selected length portions of the coating, in the direction of twist, are allowed to attain one or the other of two stable conditions, respectively characterized by a positive or negative magnetic remanence. Thus, a magnetic field of (±H) oersteds, along the direction of twist, switches the length portions from one state to another, whereas a field of ($\pm H/2$) oersteds produces only negligible changes in the magnetic remanence of the coating.

During operation of the device, a plurality of similar coils are separately wound thereabout and are positioned in a spaced side-by-side relationship with respect to one another to encompass and thereby define a corresponding plurality of helical-path length portions of ferromagnetic material. Storage of binary information in a selected length portion of the coating is accomplished by sending a current impulse of "half-select" magnitude into the conductive wire of the common core and simultaneously sending a current impulse of "half-select" magnitude into the selected coil in such directions that the vector summation of the magnetic fields produced by both of the coincident half-select currents is at least equal in magnitude to (±H) oersteds and is oriented in the same direction as the easy direction of magnetization of the coating.

During "reading" of a selected length portion of the coating, either the core or the corresponding coil is pulsed with a current impulse of "full-select" magnitude to individually develop a magnetic field of at least ±H oersteds in the opposite direction from the magnetic field developed during storage of the function. In response to the "read" impulse, an electrical signal is or is not available between the ends of the core, or the corresponding coil, depending upon which one was pulsed, according to whether the binary information (1) or (0) had previously been established in that particular length portion of the coating encompassed by that particular coil, as represented by its positive or negative magnetic remanence.

However, with reference to copending application 696,987, of J. R. Anderson et al., for "Magnetic Data Storage Devices," filed November 18, 1957, and assigned to the present assignee, there is shown and described a method of fabricating a so-called "pre-twisted" twistor which does not require the ends thereof to be fixedly secured during operation of the device. In such a fabrication process, an elongated substrate of electrically conductive material is first twisted relative to a longitudinal axis thereof. Thereafter, a ferromagnetic coating is electrodeposited on the outermost surface thereof, after which time the ends thereof are released and the coated substrate is allowed to approach its original state as before being twisted. As a result of the release, a torsional strain is stored in the ferromagnetic coating which is related to, but opposite in direction from, the mechanically applied stress stored in the substrate prior to deposition of the coating thereon. Consequently, the easy direction of magnetization of the ferromagnetic material is oriented in a helical direction with respect to the longitudinal axis of the substrate as before, but without the necessity of an external torsional strain being applied to the ends thereof after fabrication.

Even though such a "pre-twisted" magentic data storage device possesses many improved magnetic and other desirable features with respect to those previously fabricated, it is nevertheless highly desirable to completely eliminate the necessity for the application thereto of an external mechanically generated torsional strain either before, during, or after fabrication of the device.

Therefore, one of the primary objects of the present invention is to devise a new and improved magnetic data storage device which possesses all of the advantages of prior "twistor" type storage devices but does not necessitate the application of a mechanically generated torsional strain either before, during, or after fabrication thereof.

Another object of the present invention is to devise a unique magnetic data storage device which characteristically possesses a direction of magnetization which is skewed with respect to a longitudinal axis thereof and yet is substantially free from mechanically imparted torsional strain.

Still another object of the present invention is to devise such a magnetic data storage device having greatly improved magnetic and other characteristics than heretofore possible.

A corollary object of the present invention is to devise such a magnetic data storage device which is capable of being economically fabricated by mass production techniques and is readily adaptable for incorporation as a memory element in present-day electronic computers and data processors.

In accordance with the present invention, such a new and improved magnetic data device comprises an elongated electrically conductive substrate having a ferromagnetic electrodeposit disposed on the surface thereof. The electrodeposit has the characteristics of being substantially free from mechanically imparted torsional strain and having a skewed easy direction of magnetization with respect to the longitudinal axis of the substrate.

However, the novel features of the present invention, as well as the invention itself, both as to its structural organization and as to its mode of operation, will be more readily and completely understood from the following detailed description when considered in connection with the accompanying drawings, in which like reference numerals refer to like or similar elements, and in which.

Figure 1:
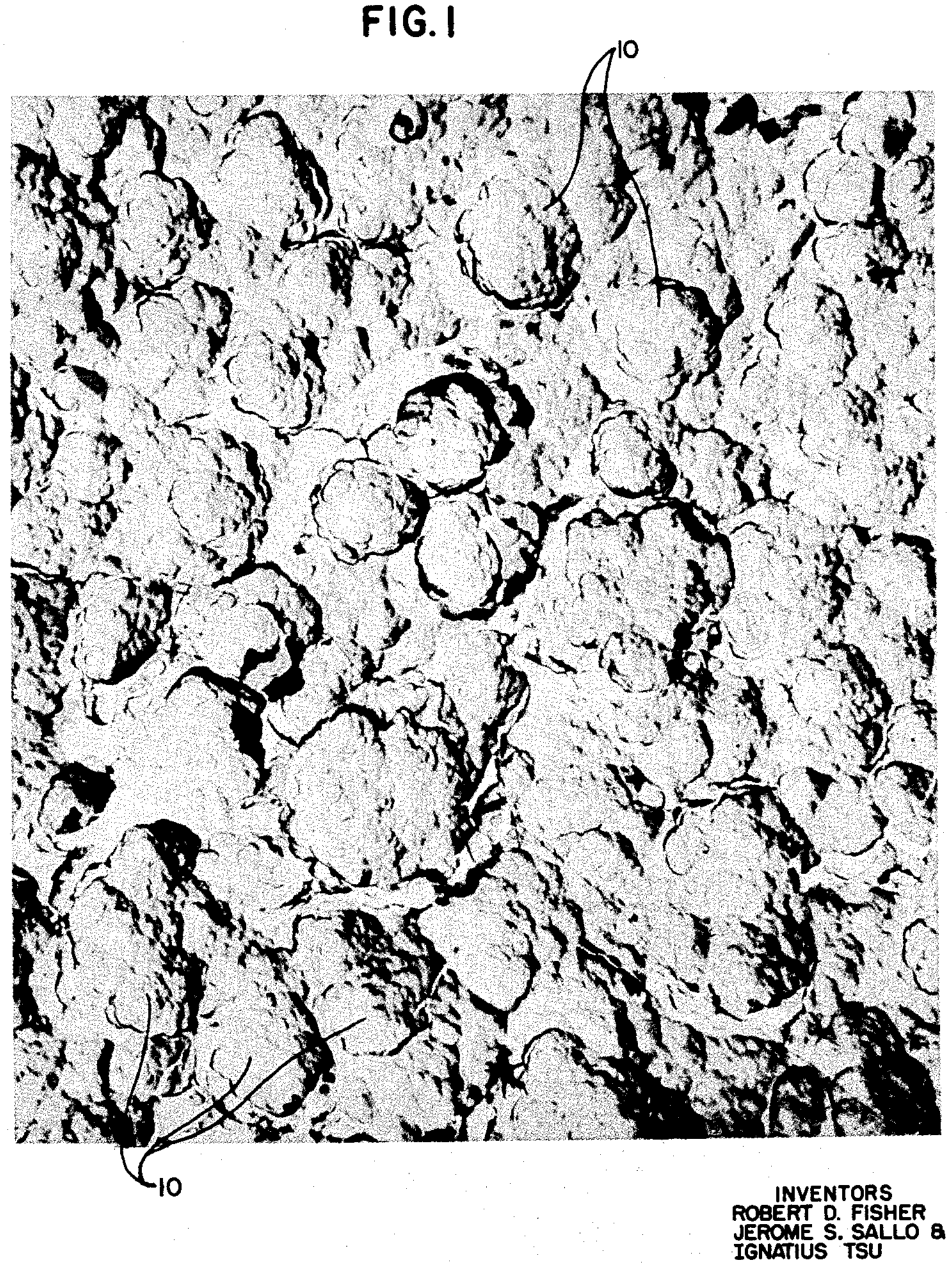
Fig. 1 is an electron micrograph of the surface of a prior non-twisted plated twistor type of magnetic data storage device, magnification 16,500X.

In the preferred electrodeposition process of fabricating the unique magnetic data storage devices of the present invention, an aqueous electrolytic bath is first prepared having preferred constituent concentrations in accordance with either of the exemplary plating baths #1, #2, or #3 which are listed below in chart form and in which chart the concentration of each constituent is given in grams per liter of aqueous solution.

| Plating Bath Constituents | Concentration (g./l.) | | |
|---|---|---|---|
| | Bath 1 | Bath 2 | Bath 3 |
| Ferric chloride ($FeCl_3.6H_2O$) | 8 | 13 | 8 |
| Ferrous chloride ($FeCl_2.4H_2O$) | ------ | 12 | ------ |
| Nickel chloride ($NiCl_2.6H_2O$) | 20 | 10 | 20 |
| Ammonium chloride ($NH_4Cl$) | 50 | 50 | 50 |
| Sodium Molybdate ($Na_2MoO_4.2H_2O$) | 1 | ------ | ------ |
| Sodium Citrate ($Na_3C_6H_5O_7.2H_2O$) | ------ | 125 | ------ |
| Ammonium Citrate ($(NH_4)_2HC_6H_5O_7.2H_2O$) | 40 | ------ | 40 |

After an electrolytic bath has been prepared having constituent concentrations as shown by either #1, #2, or #3, the pH of the bath is adjusted to approximately 8.5 by the addition thereto of a suitable amount of ammonium hydroxide ($NH_4OH$). Even though the bath may be successfully operated at ordinary room temperature, the temperature thereof, nevertheless, is preferably adjusted to approximately 90 degrees centigrade. Thereafter, the bath is introduced into a conventional rubber-lined steel plating tank, or an equivalent inert plastic container. The substrate (illustrated as 20 in Figs. 5 and 6), onto which the electrodeposit 21 is to be formed, may be composed of any of a variety of electrically conductive materials such as alloys of copper, aluminum, brass, bronze, etc. The physical shape of the substrate is not critical and may even be an extremely thin electrically conductive film which is mechanically supported by an insulating material such as glass, plastic, ceramic, or the like. For some applications, it is preferred that the substrate be in the form of a Phosphor-bronze wire having a diameter of approximately 9 mils. However, due to the fact that undesired strains tend to alter the magnetic properties of the deposit, it is generally necessary to package the devices. This problem is diminished, however, by depositing the ferromagnetic coating onto a tubular or hollow substrate, as illustrated in Fig. 6, since a tube is more rigid than a solid substrate of the same diameter. The tubular structure offers added advantages in that additional sense, drive and/or inhibit windings may be conveniently threaded therethrough in the manner as illustrated by 22 in Fig. 6. In either event, it is of course necessary that the metallic substrate, whether hollow (Fig. 6) or otherwise (Fig. 5), be cleaned in a conventional manner before plating, through the use of any of the well known alkaline-acid-water methods as used by present-day plating industries.

As in the previously described "twistor" type of magnetic data storage device as further described in the aforementioned copending application Serial No. 696,987, it is desirable to secure a relatively thin ferromagnetic deposit on the substrate having a thickness in the order of one ten-thousandths of an inch so as to maintain eddy current losses therein at a minimum and yet be thick enough to insure adequate "readout" voltage during operation of the device as a memory element. Consequently, it is necessary that the substrate be exposed as a cathode to electrolytic action in the bath for only a short period of time, preferably in the order of 1 minute, depending upon of course the particular value of cathode current density chosen to be used in the plating process. To accomplish this, the process is made a continuous one whereby the wire substrate is moved through the bath at a constant speed, by any well known means, with electrical contact at all times being maintained with the substrate to supply the plating current thereto. It is also preferred that the substrate be centrally encompassed at all times, while in the bath, by a helical-shaped anode having a coil diameter of approximately one inch and composed of an electrically conductive wire of approximately 50 mils in diameter.

The choice of anode material may not be arbitrarily made; however, molybdenum, tungsten, iron-nickel, and iron-nickel-molybdenum anodes may successfully be used provided any sludge formations originating at the anode do not enter the bath solution. One of the important factors associated with the choice of anode material, is oxidation in the system. Consequently, inert anodes such as platinum, or the like, may be used provided they do not lead to excessive system oxidation. It has been found that with the use of either of plating baths #1 or #3, molybdenum anodes are preferred as they do not have to be "bagged" and tend to replenish and/or supply the bath with molybdenum ions; with the use of plating bath #2, a tungsten anode is preferred. Even when a molybdenum anode is used with bath #1, it may be necessary to continually add molybdate solution to the bath in order to maintain the concentration thereof constant at the desired value. It is believed that the ferrous and ferric ions are present in the bulk of the bath solution as a soluble anionic complex, and it is further believed that the ferrous to ferric ionic ratio is of primary concern as to the composition and production of preferred direction of orientation in the electrodeposit by means of crystal growth and orientation therein. However, it has been found that the desired direction of crystal orientation is obtained even though the ferrous to ferric ionic ratio is permitted to vary from 0 to 10 as shown by the constituent concentration of baths #1, #2, and #3. Consequently, it may be necessary that the iron solutions be continually added to each of the baths to maintain the concentrations thereof constant at their respective values during the entire plating process.

The current density involved in the deposition process is not critical and may range, for example, from 250 to 1,000, preferably 500, amperes per square foot of carrier surface area exposed in baths #1 and #3 and from 50 to 500, preferably 380, amperes per square foot of carrier surface area exposed in bath #2. The current density primarily determines the rate of deposition of the metallic ions onto the cathode and also affects the rate of diffusion into the cathode film which influences the amount of depositing species which must be in equilibrium with the reservoir complexes. Consequently, the bath constituents and current density of the process must be compatible, and the current density may not be arbitrarily chosen. As the current density is one of the prime factors which determine the structure of the deposit, it is generally necessary to modify the plating system to permit the use of a specific current density.

Figure 5:
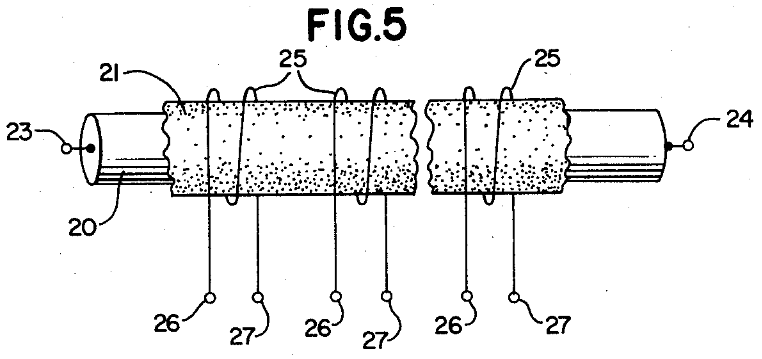
Figs. 5 and 6 illustrate modes of operation of the novel magnetic data storage devices of the present invention.
Figure 6:
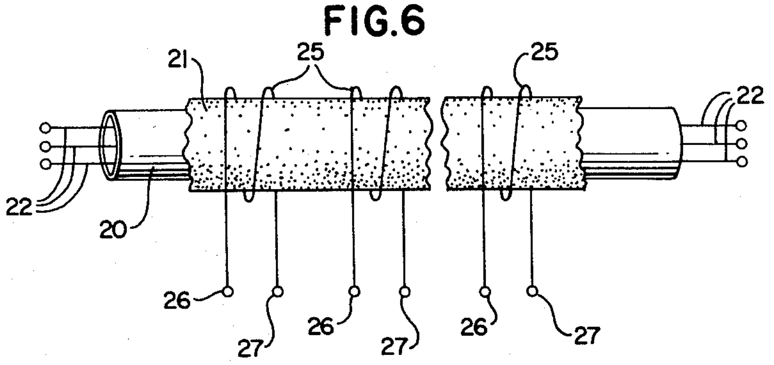

On emergence from the plating bath, the ferromagnetic element is rinsed and dried and is then ready to be incorporated into the electrical circuitry of present-day electronic computers and data processors and operated as a coincident current memory element in the same manner as the previously described "twistor" type of magnetic data storage devices and as diagrammatically illustrated in Figs. 5 and 6.

Listed below in chart form, are the electrical operational characteristics of such storage devices in accordance with the present invention which were fabricated by the just described electrodeposition process which utilized each of the electrolytic baths #1, #2, and #3 having preferred constituent concentrations as previously shown. In the chart (I*r*) represents the "half-select" current impulse applied across the ends of the ferromagnetic element during storage of the function, via terminals 23 and 24 (Fig. 5); (I*s*) represents the "half-select" current impulse applied across the ends of a selected one of coils 25 during storage of the function, coils 25 each being circumferentially wound about the ferromagnetic element and spaced apart in the same manner and for the same purposes as heretofore described; (I*s*′) represents the "full-select" current impulse applied across the ends of a selected one of coils 25 via terminals 26—27 during reading of the function; (*u*V1) represents the instantaneous readout potential appearing across the ends of the ferromagnetic element at terminals 23—24 indicative of any reversal of the magnetic remanence of the element, i.e. due to pervious binary 1 storage; and (*uV*1/*dVz*) represents the operational signal to noise ratio of the storage element.

Therefore, it is seen that in accordance with the present invention, there has been devised a new and improved ferromagnetic data storage element whcih is capable of being economically fabricated from ternary alloys of iron and nickel with either molybdenum or tungsten and which possess a skewed easy direction of magnetization characteristic, with respect to the longitudinal axis thereof, without the need for mechanically imparted torsional strain either before, during, or after the deposition process. Additionally, such a device has greatly improved magnetic and other properties than heretofore possible and is readily adaptable to be incorporated into the electrical circuitry of present day electronic computers and data processors with a minimum expenditure of time and effort.

While particular embodiments of the invention have been shown and described, it will be obvious to those skilled in the art of electrodeposition of ferromagnetic materials, that changes and modifications may be made without departing from the invention in its broader aspects, and therefore, the aim in the appended claims is to cover all such changes and modifications as fall within the true spirit and scope of the invention.

What is claimed is:

1. A magnetic data storage device comprising an elongated electrically conductive substrate and a ferromagnetic electrodeposit disposed on the surface of said substrate, said electrodeposit being substantially free from mechanically imparted torsional strain and having a preferred direction of crystal orientation which produces a skewed easy direction of magnetization of said electrodeposit with respect to the longitudinal axis of said substrate.

2. A magnetic data storage device comprising an elongated electrically conductive core and a ferromagnetic electrodeposit disposed on the surface of said core, said electrodeposit being substantially free from mechanically imparted torsional strain and having a preferred direction of crystal orientation which produces an inclined easy direction of magnetization of said electrodeposit with respect to the longitudinal axis of said core.

| | Bath #1 | | Bath #2 | Bath #3 |
|---|---|---|---|---|
| Ir | 190 ma. | 68 ma. | 250 ma. | 170 ma. |
| Is | 44 ma. | 50 ma. | 92 ma. | 96 ma. |
| Is′ | 300 ma. | 300 ma. | 500 ma. | 500 ma. |
| *u*V1 | 300 mv. | 110 mv. | 30 mv. | 50 mv. |
| *u*V1/*d*V*z* | 20 | 30 | 3 | 50. |
| No. Turns of coil | 40 | 40 | 20 | 20. |
| Wire size of coil | #36 | #36 | #36 | #36. |
| Wire size of element | 9 mils | 3 mils | 9 mils | 9 mils. |
| Amount of twist | None | None | None | None. |
| Switching time | <.3 μsec | <.3 μsec | <.3 μsec | <.3 μsec. |
| Coercivity | <5 oersteds | <5 oersteds | <5 oersteds | <5 oersteds. |
| Hysteresis squareness | Approx. .99 | Approx. .99 | Approx. .99 | Approx. .99. |

Figure 3:
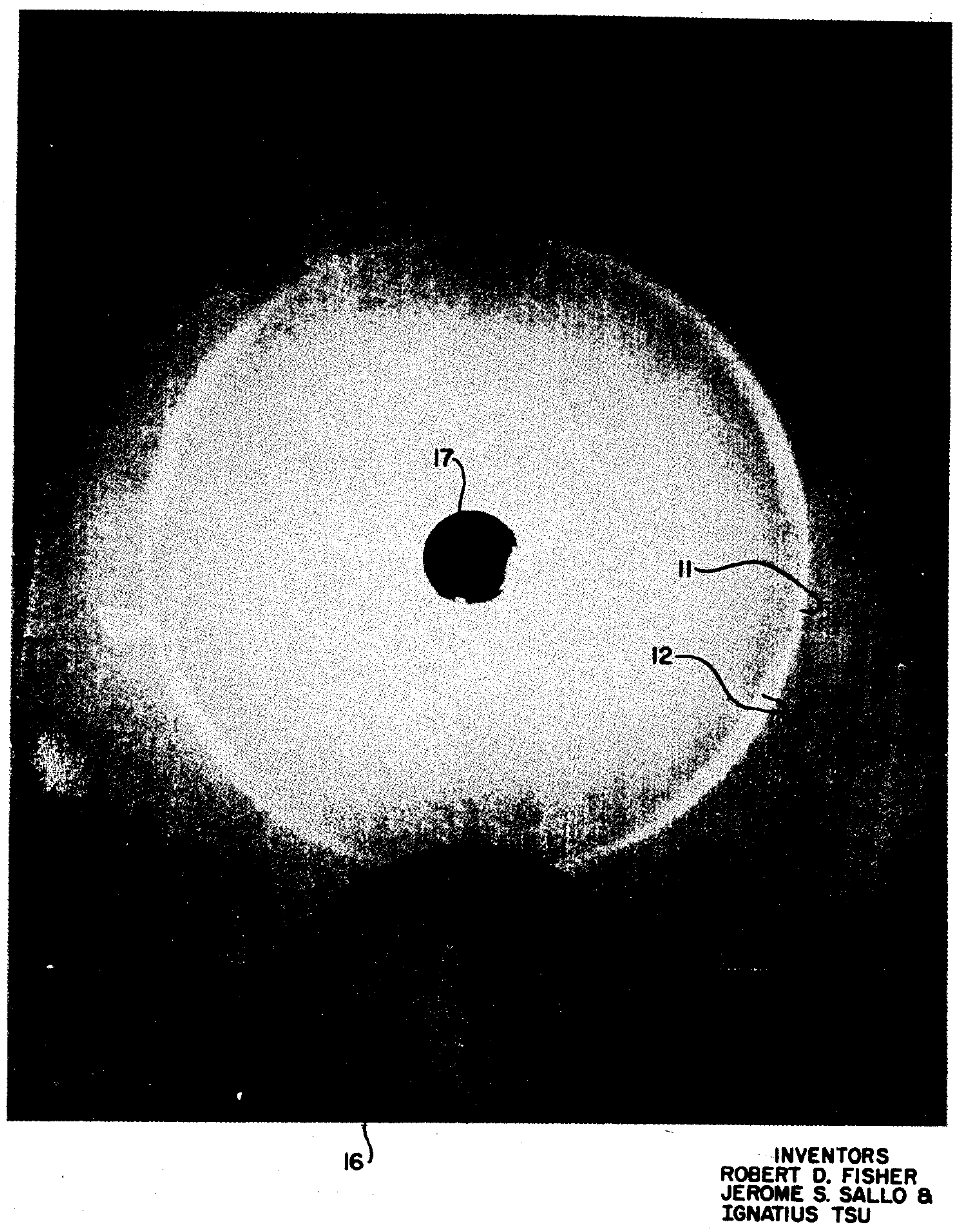
Fig. 3 is an X-ray diffraction pattern of the same non-twisted plated twistor type of magnetic data storage device as shown in Fig. 1.

With reference to Figs. 1 and 3 of the drawings, it is seen that the ferromagnetic deposit on prior untwisted twistor type of storage devices, such as disclosed in previously referred-to co-pending application 696,987, appears to have no substantial preferred orientation. This is indicated first of all by the random distribution of ferromagnetic botryoids 10 as seen in Fig. 1 and by the continuous nature of the second diffraction ring 11 in Fig. 3, the first discontinuous diffraction ring 12 indicating the preferred orientation of the substrate.

Figure 2:
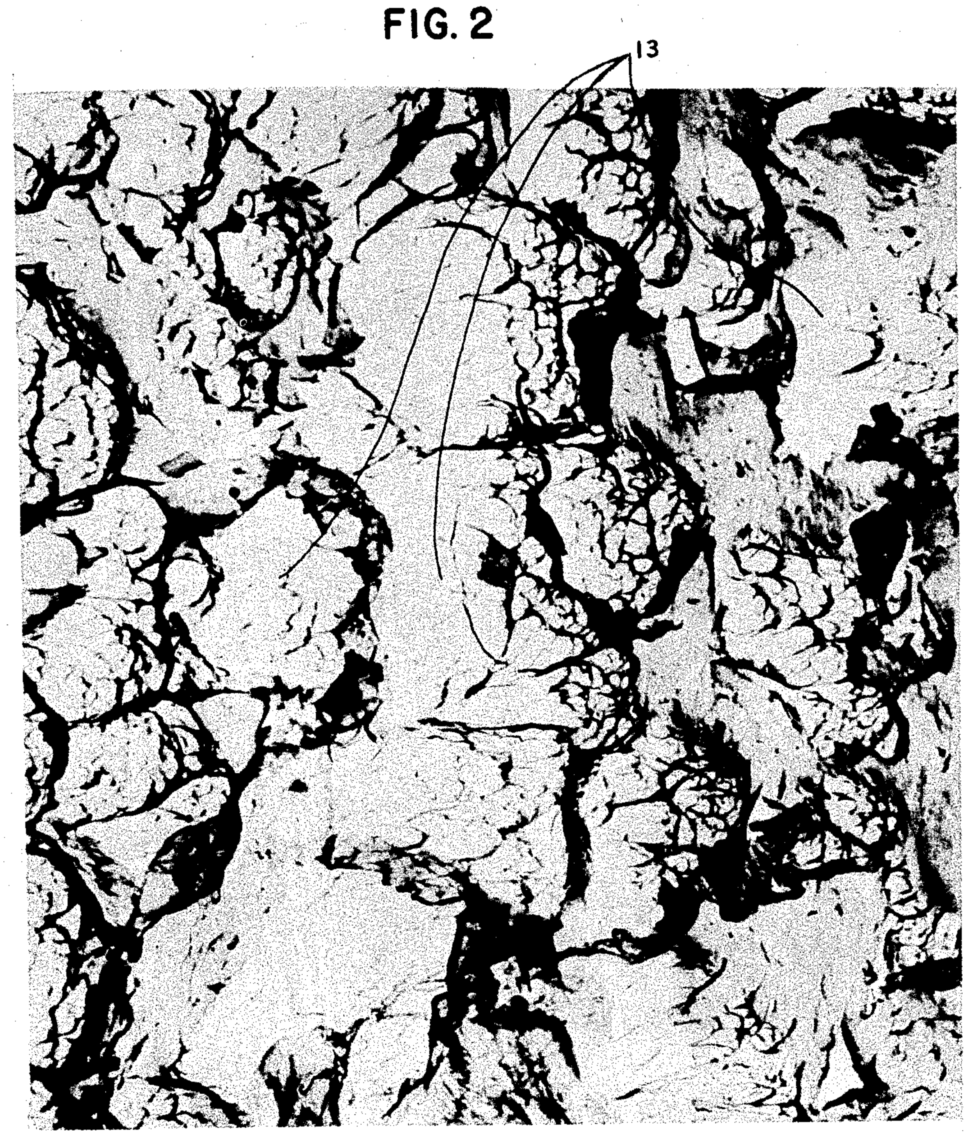
Fig. 2 is an electron micrograph of the surface of a magnetic data storage device in accordance with the present invention, magnification 16,500X.
Figure 4:
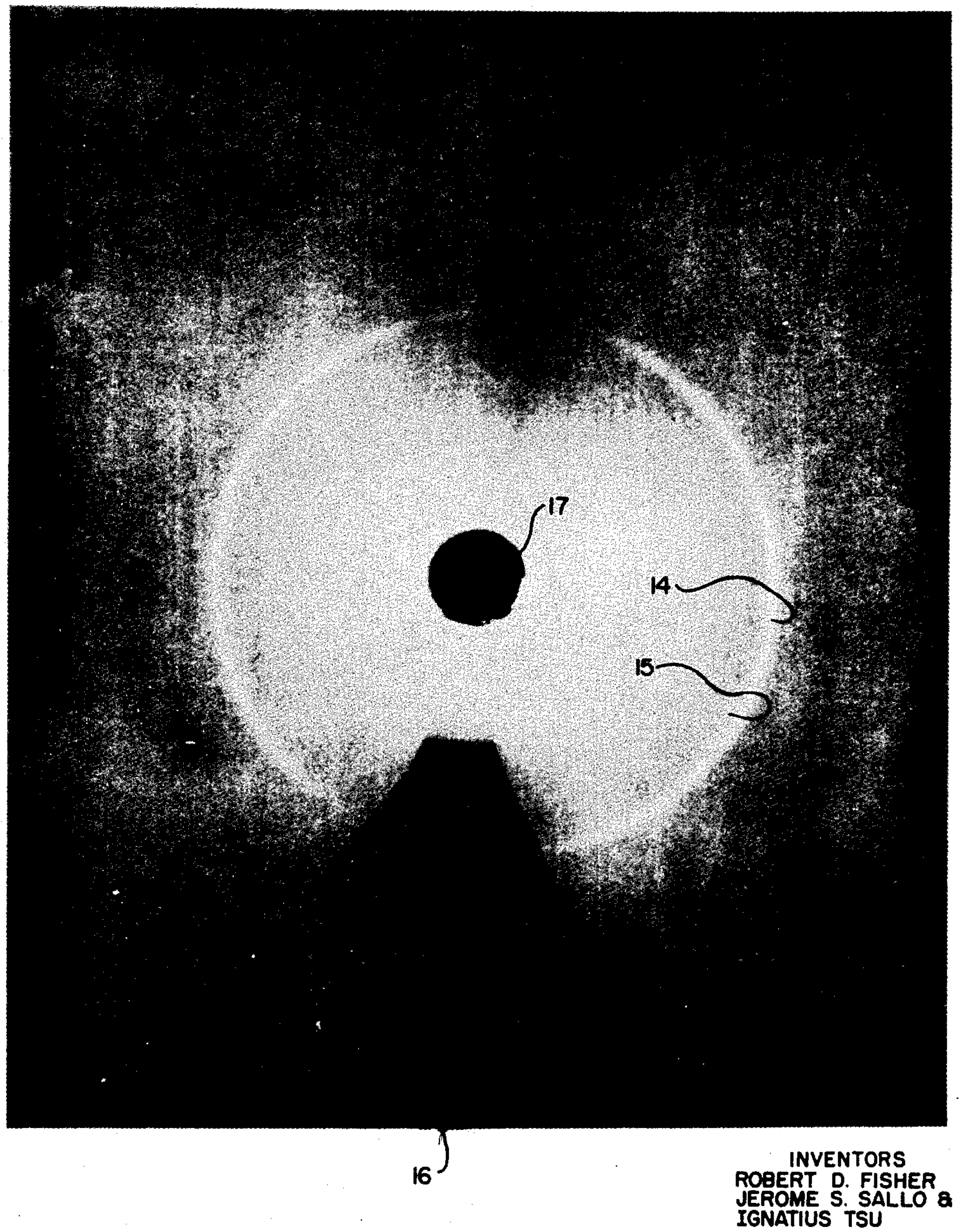
Fig. 4 is an X-ray diffraction pattern of the magnetic data storage device in accordance with the present invention as shown in Fig. 3.

As seen in Figs. 2 and 4, the ferromagnetic deposits on the storage devices of the present invention, appear to have a substantial preferred orientation which is believed to account for the beneficial magnetic properties of such devices. This is indicated first of all by the grainy distribution of ferromagnetic botryoids 13 as seen in Fig. 2 and also by the discontinuous nature of the second diffraction ring 14 in Fig. 4, the first discontinuous diffraction ring 15 indicating the preferred orientation of the substrate.

In each instance, the black area 16 at the bottom of the diffraction photos in Figs. 3 and 4 is the shadow cast by the sample holder. The central blackened area 17 in each figure is the portion of the film exposed to the direct X-ray beam.

3. A magnetic data storage device comprising an elongated electrically conductive subtrate and a ferromagnetic electrodeposit disposed on the surface of said substrate, said electrodeposit being substantially free from mechanically imparted torsional strain and having a preferred direction of crystal orientation yielding a helical-shaped easy direction of magnetization of said electrodeposit with respect to the longitudinal axis of said substrate.

4. A magnetic data storage device comprising an elongated electrically conductive substrate and a ferromagnetic electrodeposit concentrically disposed on the surface of said substrate, said electrodeposit being substantially free from mechanically imparted torsional strain and having a preferred direction of crystal orientation which produces a skewed easy direction of magnetization of said electrodeposit with respect to the longitudinal axis of said substrate.

5. A magnetic data storage device comprising: an elongated electrically conductive substrate having a hollow formed therethrough along the longitudinal axis thereof; and a ferromagnetic electrodeposit disposed on the surface of said substrate, said electrodeposit being substantially free from mechanically imparted torsional strain and having a preferred direction of crystal orientation which produces a skewed easy direction of magnetization of said electrodeposit with respect to said longitudinal axis.

6. A magnetic data storage device comprising a substantially cylindrical shaped electrically conductive substrate and a ferromagnetic electrodeposit disposed on the surface of said substrate, said electrodeposit being substantially free from mechanically imparted torsional strain and having a preferred direction of crystal orientation which produces a skewed easy direction of magnetization of said electrodeposit with respect to the axis of said substrate.

7. A magnetic data storage device comprising an elongated electrically conductive substrate and a ferromagnetic iron-nickel-molybdenum electrodeposit disposed on the surface of said substrate, said electrodeposit being substantially free from mechanically imparted torsional strain and having a preferred direction of crystal orientation which produces a skewed easy direction of magnetization of said electrodeposit with respect to the longitudinal axis of said substrate.

8. A magnetic binary data storage device comprising an electrically conductive wire core and a ferromagnetic iron-nickel-molybdenum electrodeposit concentrically disposed on the surface of said core, said electrodeposit being substantially free from mechanically imparted torsional strain and having a preferred direction of crystal orientation which produces a helical-shaped easy direction of magnetization of said electrodeposit with respect to the longitudinal axis of said core.

9. A magnetic data storage device in accordance with claim 1 in which said device is encompassed by a plurality of similar electrically energizable coils spaced sdie-by-side with respect to one another.

10. A magnetic data storage device in accordance with claim 6 having a plurality of electrical conductors threaded therethrough.

11. A magnetic data storage device comprising an elongated electrically conductive substrate and a ferromagnetic electrodeposit on said substrate, said electrodeposit being substantially free from mechanically imparted torsional strain and having a skewed easy direction of magnetization with respect to the longitudinal axis of said substrate.

12. A magnetic data storage device comprising an elongated electrically conductive substrate and a ferromagnetic electrodeposit on substantially the entire surface area of said substrate, said electrodeposit being substantially free from mechanically imparted torsional strain and having a skewed easy direction of magnetization with respect to the longitudinal axis of said substrate.

13. A magnetic data storage device comprising an elongated electrically conductive substrate and a ferromagnetic electrodeposit on said substrate, said electrodeposit being substantially free from mechanically imparted torsional strain and having a skewed easy direction of magnetization with respect to the longitudinal axis of said substrate and a preferred direction of crystal orientation.

References Cited in the file of this patent

UNITED STATES PATENTS

| | | |
|---|---|---|
| 2,112,084 | Frey et al. | Mar. 22, 1938 |
| 2,706,329 | Hespenheide | Apr. 19, 1955 |